United States Patent [19]

Coran et al.

[11] 4,414,267

[45] Nov. 8, 1983

[54] METHOD FOR TREATING DISCONTINUOUS CELLULOSE FIBERS CHARACTERIZED BY SPECIFIC POLYMER TO PLASTICIZER AND POLYMER-PLASTICIZER TO FIBER RATIOS, FIBERS THUS TREATED AND COMPOSITES MADE FROM THE TREATED FIBERS

[75] Inventors: Aubert Y. Coran; Lloyd A. Goettler, both of Akron, Ohio

[73] Assignee: Monsanto Company, St. Louis, Mo.

[21] Appl. No.: 252,514

[22] Filed: Apr. 8, 1981

[51] Int. Cl.³ .................... B32B 23/02; B32B 23/08
[52] U.S. Cl. ................................ 428/288; 428/294; 428/295; 428/302; 428/326; 428/361; 524/14; 524/35
[58] Field of Search .............. 260/17.4 CL; 428/295, 428/297, 302, 361, 326, 288; 524/14, 35

[56] References Cited

U.S. PATENT DOCUMENTS

| 3,265,644 | 8/1966 | Herman et al. | 260/8 |
|---|---|---|---|
| 3,461,012 | 8/1969 | Wicker | 156/193 |
| 3,697,364 | 10/1972 | Boustany et al. | 161/59 |
| 3,836,412 | 9/1974 | Boustany et al. | 156/62.2 |
| 3,943,079 | 3/1976 | Hamed | 260/17.4 |
| 4,263,184 | 4/1981 | Leo et al. | 260/17.4 |

*Primary Examiner*—James C. Cannon
*Attorney, Agent, or Firm*—Gordon B. Seward

[57] ABSTRACT

Discontinuous cellulose fibers are treated to improve their dispersability into a matrix comprising plasticized vinyl chloride polymer. The treatment includes contacting the fibers with a mixture of an aqueous dispersion of a vinyl chloride polymer and a plasticizer so as to coat the fibers, and drying the fibers. The non-aqueous portion of the mixture is usually present in an amount of at least 25 parts per 100 parts of fibers by weight, and the weight ratio of plasticizer to vinyl chloride polymer in the mixture is from 2:1 to 25:1. The discontinuous fibers thus treated can be dispersed into a matrix comprising plasticized vinyl chloride polymer with a minimum of mixing, and the improved composites thus produced contain a minimum of clumps of undispersed fibers.

15 Claims, 1 Drawing Figure

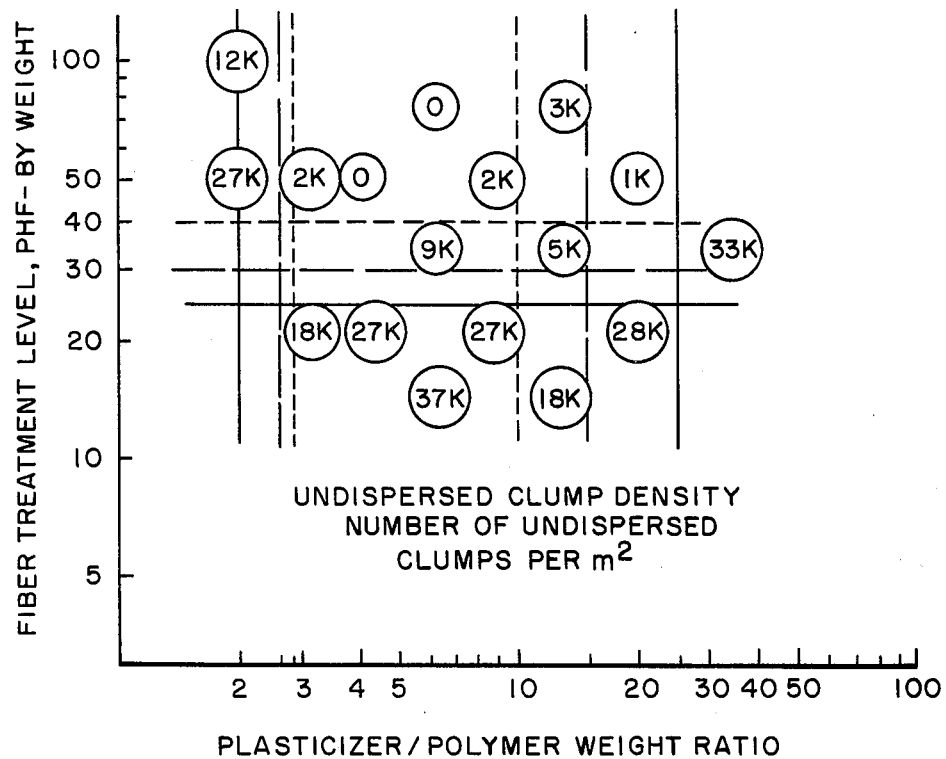

METHOD FOR TREATING DISCONTINUOUS CELLULOSE FIBERS CHARACTERIZED BY SPECIFIC POLYMER TO PLASTICIZER AND POLYMER-PLASTICIZER TO FIBER RATIOS, FIBERS THUS TREATED AND COMPOSITES MADE FROM THE TREATED FIBERS

BACKGROUND OF THE INVENTION

This invention relates to a method of treating cellulose fibers to improve their dispersability into an organic polymer matrix, to the fibers thus treated, and to composites of organic polymers and the fibers.

It is well known to incorporate discontinuous fibers into an organic polymer matrix to form composite materials having improved properties. For example, Boustany et al U.S. Pat. No. 3,697,364 describes composites of this type in which the contained fibers are oriented so as to give considerable strength and stiffness to the composites in the direction of fiber orientation.

It is also known that the dispersion of discontinuous cellulose fibers into a polymeric matrix can be greatly facilitated by pretreatment of the fibers with a plastic polymer and a lubricant. U.S. Pat. No. 3,943,079 to Hamed describes such a pretreatment.

SUMMARY OF THE INVENTION

It has now been found that for incorporating discontinuous cellulose fibers into a matrix comprising plasticized vinyl chloride polymer, certain critical ratios of polymer and lubricant to fiber are essential in the pretreatment step.

According to the present invention, discontinuous cellulose fibers are contacted with a mixture of an aqueous suspension of a vinyl chloride polymer and a plasticizer so as to cause the polymer and plasticizer to deposit on the fibers. The fibers are then dried so as to produce treated fibers of improved dispersability into a matrix comprising plasticized vinyl chloride polymer. The vinyl chloride polymer in the treatment mixture need not be the same as that in the matrix, but should be compatible therewith. Likewise, the plasticizer in the treatment mixture need not be the same as that in the matrix, but should be compatible with the matrix. In the treatment of the invention, the non-aqueous portion of the mixture is present in an amount of at least 25 parts, preferably at least 30 parts and more preferably at least 40 parts, per 100 parts of fibers by weight, and the weight ratio of plasticizer to polymer in the mixture is from 2:1 to 25:1, preferably from 2.5:1 to 15:1, and more preferably from 2.8:1 to 10:1.

The invention also includes the treated fibers produced by the described method and includes treated fiber comprising discontinuous cellulose fiber of aspect ratio greater than 20, vinyl chloride polymer and a plasticizer for said polymer wherein the polymer and plasticizer together are present in an amount of at least 25 parts by weight per 100 parts of cellulose fiber by weight and the weight ratio of plasticizer to polymer is from 2:1 to 25:1. The invention also includes a composite of the treated fibers of the invention dispersed in a matrix comprising plasticized vinyl chloride polymer.

BRIEF DESCRIPTION OF THE DRAWING

The drawing is a graphic representation of the effect of the relative quantities of fiber and fiber treatment mixture and of the ratio of plasticizer to polymer in the mixture on fiber dispersability.

DESCRIPTION OF THE PREFERRED EMBODIMENTS

Cellulose is a carbohydrate polymer of glucose residue units. It can be either regenerated or unregenerated (natural) cellulose. Rayon is regenerated cellulose. Examples of natural cellulose fibers include seed fibers such as cotton, woody fibers represented by coniferous and deciduous woods, bast fibers represented by flax, leaf fibers such as sisal, and fruit fibers such as coconut. However, wood fibers, either hardwood or softwood, are preferred. Especially preferred is hardwood kraft, made by the sulfite process. The fibers have an aspect ratio (length divided by average diameter) greater than 20.

Preferably, the fibers comprise those having aspect ratios within the range of 20–350, with a more preferred range of 50–350, and an even more preferred range of 75–200. In some instances, it is desirable to use mixtures of fibers having widely differing aspect ratios. The improved dispersability of the fibers of the invention is important in that excessive mixing, which tends to increase fiber breakage, can be avoided. The final aspect ratio of the fibers strongly affects the modulus attained in the composites. Further, reduced mixing times are favorable to process economy. In some instances, untreated fibers will never give good dispersions, regardless of the mixing time.

The polymer contained in the treatment mixture is described as being "vinyl chloride polymer" and includes both vinyl chloride homopolymer and copolymer of a major proportion of vinyl chloride with a minor proportion of other copolymerizable monomers such as vinyl acetate or vinylidene chloride. The polymer is employed in aqueous dispersion, preferably in the form of a latex, although a slurry or dispersion of small particle size polymer in water can be employed. Particles of vinyl chloride polymer are preferably less than 10 $\mu$m in diameter, more preferably less than 5 $\mu$m in diameter, and even more preferably less than 2 $\mu$m in diameter on the average. The order of addition of aqueous polymer suspension and plasticizer to the fibers is not critical—either can be added first, or both at once. Optionally, the polymer can be accompanied by a plasticizer intimately mixed therewith, as in a latex of a pre-plasticized polymer.

The plasticizer used in the treatment mixture should be one which is compatible with the vinyl chloride polymer matrix as described. An incompatible plasticizer can be used if the composite contains enough of a primary or compatibilizing plasticizer. For a discussion of plasticizers, see *Encyclopedia of Polymer Science and Technology*, Vol. 10, p. 128 et seq. (J. R. Darby, author) John Wiley & Sons, Inc., New York, 1969. Examples of effective plasticizers include adipates, such as di-2-ethylhexyl adipate and diisodecyl adipate; azelates, such as di-2-ethylhexyl azelate; benzoates, such as dipropylene glycol dibenzoate; phosphates, such as tricresyl phosphate, cresyl diphenyl phosphate, 2-ethylhexyl diphenyl phosphate, di-n-octyl phenyl phosphate, and tri-n-hexyl phosphate; phthalates, such as diethyl phthalate, butyl benzyl phthalate, di-2-ethylhexyl phthalate, and diisodecyl phthalate; sebacates, such as di-2-ethylhexyl sebacate and terephthalates, such as di-2-ethylhexyl terephthalate. A compatible blend of two or more plasticizers can be used. In use, the plasticizer has the effect not only of softening and modifying the polymer, but also of lubricating the fiber surfaces, promoting dispersion and minimizing fiber breakage.

The fibers are described as "discontinuous", to distinguish from the well known incorporation of continuous cord reinforcement into rubber articles. The "matrix" is the material forming a continuous phase which surrounds the fibers. A "composite" is the combination of discontinuous fibers in a matrix wherein the contained fibers may be randomly oriented, or, to a greater or lesser degree, aligned in a particular direction. Composites in which the fibers are highly aligned, as taught in U.S. Pat. No. 3,697,364, mentioned above, are particularly useful, in calendered or extruded objects.

In the step of contacting the fibers with the treatment mixture, the fibers can be slurried in water and mixed with the polymer and plasticizer. This step provides for separation of the fiber bundles, to allow maximum contact with the treatment mixture, and it also softens the fibers, making them more flexible during the contacting step. As compared with the process of treating fibers according to the disclosure of Hamed U.S. Pat. No. 3,943,079, the instant process is as effective; yet, it does not require the heavy, powerful mixing equipment used by Hamed and it does not cause fiber degradation.

During the contacting step, which can be preformed with differing degrees of agitation, the vinyl chloride polymer and plasticizer are deposited onto the surfaces of the fibers, to form a relatively homogeneous coating. If necessary, high shear agitation can be used, and heat or a coagulant can be employed, in order to insure coagulation of the polymer and plasticizer onto the fibers. The fibers are then de-watered by filtration or other means, and dried. Since cellulose fibers are somewhat hygroscopic, the drying step is usually not carried to a complete removal of water, although for some purposes the amount of contained water will be minimized.

If desired, rather than slurrying them, the fibers can be treated while they are in an agglomerated state, as in a sheet form. In treating a sheet of fibers, it can be saturated with a mixture of plasticizer and an aqueous dispersion of polymer and then dried to produce a treated sheet. A continuous fiber sheet can be dipped, for example, into the treatment mixture, and then fed into drying apparatus, such as heated rolls or a hot air oven to remove the water. Such a treated sheet can then be later incorporated into additional vinyl chloride polymer and plasticizer or additional vinyl chloride polymer and plasticizer can be applied to the sheet. For example, a continuous strip of treated fiber can be fed into an extruder along with the plasticizer and polymer, to form a continuous extruded composite which is subjected to further shaping operations, which align the fibers as desired.

When drying fibers which have been slurried, treated, and then de-watered by filtration, any of a variety of drying methods can be used. The de-watered fibers will usually form a friable cake, which can be mechanically broken up into clumps of fibers which are air dried. Alternatively, the cake can be first air-dried, then broken up into crumbs or clumps. If desired, the cake can be pressed to compact it (and expel additional water), then dried in its pressed form.

As stated above, the treatment mixture, containing vinyl chloride polymer and plasticizer, is employed during the treatment of the fibers in an amount of at least 25 parts, preferably at least 30 parts, and more preferably at least 40 parts or more of non-aqueous mixture per 100 parts of fibers by weight. This treatment level is relatively high compared to prior art ratios, and has been found to be a significant factor in enhancing dispersion of the treated fibers into a matrix. Although a maximum level of treatment mixture is not stated, it is clear that this level will be ultimately limited by the amount of matrix material in the final composite.

For example, if the fibers are to be used in a finished composite in an amount of fifteen weight percent of the total composite weight, then the treatment level on the fibers cannot exceed eighty-five parts per fifteen parts of fiber, or stated another way, 567 parts per 100 parts of fibers by weight. In this example, given as an extreme, all of the matrix (or non-fiber) portion of the composite is considered to be treatment, and thus the composite is produced in a single step, rather than by the initial step of pretreating the fibers followed by a final step of incorporating the treated fibers into a polymeric matrix to form a composite. If a lower fiber level were desired in the final composite, say 3 percent fiber based on the total composite weight, a similar calculation will show that the treatment level, expressed as parts by weight per 100 parts of fiber, could be as high as 3233 parts. Obviously, then the upper limit of the treatment level is dictated solely by the final composite composition and convenience of handling. Frequently, it is desired to have the treated fibers in particulate form, rather than in a mass, so that a level of treatment would be selected to produce particulate or crumb product form. This treatment level would usually be less than about 300–400 parts of coating per 100 parts of fiber.

As indicated above, the weight ratio of plasticizer to vinyl chloride polymer in the treatment mixture according to the method of the invention is from 2:1 up to 25:1, preferably from 2.5:1 up to 15:1, and more preferably, from 2.8:1 up to 10:1. Mixtures within these ranges are found to produce treated fibers having superior dispersability into a matrix to form a composite. In addition to plasticizer and vinyl chloride polymer, the treatment mixture can also contain carbon black; filler, such as clay; alumina; talc and the like, as well as other ingredients used in the polymer art, including stabilizers, antidegradants, pigments, colors, and the like.

The treated fibers of the invention can be further combined with the matrix material in a suitable mixer, such as an internal mixer (e.g., Banbury) or roll mill. The Brabender mixer is particularly effective for this purpose in the laboratory. Additional ingredients, such as fillers, colorants, stabilizers and additional plasticizer can also be added at this point. If desired, the fibers can then be oriented in the final composite, by passing a sheet of the composite through a hot roll mill. Several passages are often used in order to optimize orientation of the fibers in the direction of passage through the rolls. This is followed by compression molding of the sheet to produce a desired article. Alternatively, the composite can be extruded to align the fibers axially. If a hose or tube shaped product is desired, axial orientation of fibers can be produced therein, or, by using the techniques set forth in U.S. Pat. Nos. 4,056,591 and 4,057,610, in a direction other than axial.

EXAMPLE I

To illustrate a preferred method of fiber treatment, twenty grams of "Pinnacle" wood pulp (produced by Westvaco) is charged to the bowl of a Waring Blender.

The pulp is hygroscopic and, as equilibrated with laboratory air, contains about 8% moisture. To the pulp is added about 700 ml. of water and the agitation is started. Polyvinylchloride latex (Geon 575×43, 56% solids, plasticized with 25 phr of a phosphate plasticizer) diluted with an equal volume of water is added at varying levels. Butyl benzyl phthalate plasticizer in the desired amount is then added, followed by a coagulant (0.3 to 1.3 grams alum dissolved in 50 ml. water). Mixing is continued for about thirty seconds, and the fibers are then collected by filtration; washed with water twice, and dried, either at room temperature or in an oven at 120° C. The low turbidity of the effluent water indicates nearly quantitative deposition of the ingredients onto the fibers.

EXAMPLE II

To show incorporation of the treated fibers into a matrix of a plasticized vinyl chloride polymer, the fibers of Example I are mixed with a typical green garden hose compound. The compound, containing approximately 50 parts of plasticizer and 6 parts of other additives per 100 parts polyvinylchloride (PVC) resin, is charged to the chamber of a Brabender mixer equipped with cam type rotors, and fluxed, together with additional PVC, at a temperature of 150° C., with a rotor speed of 100 rpm. The treated fiber is added and mixed for one minute; then a bonding agent is added. The charge is then mixed for additional time, totaling either 3 or 5 minutes after the fiber addition.

The composites thus produced are removed from the mixer and passed repeatedly through the nip of a roll mill (three to five times, with doubling each time) to orient the fibers in a single direction. The aligned sheet is then compression molded in a frame mold at 165° C. under a pressure of 1.38 MPa to produce a void-free sheet.

In order to evaluate the dispersion of the fibers in the matrix, the density of undispersed clumps is measured over a cut surface. Several slices are made in a sheet, to expose at least 8 cm.$^2$ of cut surface. Those white undispersed clumps which could be identified without magnification were counted.

EXAMPLE III

In the course of our work, it has been determined that the amount of treatment mixture deposited on the fibers and the ratio of plasticizer to polymer in the mixture considerably affect the ease of dispersion of the treated fibers into the matrix. In order to investigate the nature of the causes and effects, an experiment was designed in which a logarithmic factorial array was employed for the composition variations.

By using the procedure set forth in Example I, above, seventeen samples of treated fiber were prepared, the samples having varying ratios of plasticizer to vinyl chloride polymer and varying amounts of fiber treating materials deposited on the fibers. Composites were then prepared according to the procedures set forth in Example II, above, in which all composite samples contained 15.0% by weight of cellulose fiber, 0.8% by weight bonding agent (Vulcabond VP, a 25% solution of an isocyanurate polymer of toluene diisocyanate, in dibutyl phthalate, manufactured by Vulnax International, Ltd.), the remainder being vinyl chloride polymer and plasticizers. The density of undispersed clumps was measured on each sample as in Example II, and the results were summarized as shown in the accompanying drawing, which shows, numerically, the density of undispersed clumps in clumps per square meter, on logarithmic coordinates of fiber treatment level and plasticizer to vinyl chloride polymer weight ratio. The fiber treatment level is expressed in parts by weight of coating material per 100 parts by weight of fiber. Limits of each variable are indicated by solid lines, the preferred limits by a line of long dashes, and the most preferred limits by a line of short dashes. The letter "K" indicates one thousand, thus 3K, for example, should be read as three thousand.

It can be seen that within the claimed limits the clump density is at a minimum level, but outside the claimed limits the clump density is considerably higher. The transition between the minimum and the area of poor dispersion due to too low plasticizer concentration (in the coating) is especially abrupt, indeed.

In summary, the method of the invention offers a simple, low-energy process for producing treated cellulose fibers. The fibers of the invention are particularly suited for rapid and efficient dispersion into plasticized polymers of vinyl chloride. The composites of the invention are useful in the form of articles having superior strength and stiffness without the use of continuous cord for reinforcement in a braided, knit or other configuration. Additionally, the composites of the invention can take the form of floor tile compositions, containing a relatively high proportion of inert filler, such as calcium carbonate.

Although the foregoing invention has been described in some detail by way of illustration and example for purposes of clarity of understanding, it will be obvious that certain changes and modifications may be practiced within the scope of the appended claims.

We claim:

1. The process of treating discontinuous cellulose fibers by slurrying said fibers in water, contacting said fibers with a mixture of (a) an aqueous suspension of a vinyl chloride polymer in which suspension the polymer has a particle diameter of 10μm or less and (b) a plasticizer for said polymer, causing the polymer and plasticizer to deposit on the fibers, and drying the treated fibers, wherein the polymer and plasticizer together are present in an amount of at least 25 parts per 100 parts of fiber by weight, and the weight ratio of plasticizer to polymer in the mixture is from 2.5:1 to 25:1.

2. The process of claim 1, wherein the polymer and plasticizer together are present in an amount of at least 30 parts per 100 parts of fibers by weight, the weight ratio of plasticizer to polymer in the mixture is from 2.5:1 to 15:1, and the polymer in aqueous suspension has a particle diameter of 5 μm or less.

3. The process of claim 1, wherein the non-aqueous portion of the mixture is present in an amount of at least 40 parts per 100 parts of fibers by weight, and the weight ratio of plasticizer to polymer in the mixture is from 2.8:1 to 10:1.

4. The process of claim 1, wherein the aqueous suspension of the polymer is a latex.

5. The process of claim 1, wherein a coagulent is added to cause the mixture to deposit on the fibers.

6. The process of claim 1, wherein the mixture also contains a filler.

7. The process of claim 1, wherein the mixture also contains a bonding agent.

8. The process of claim 1 wherein the aspect ratio of the cellulose fiber is within the range of 50–350.

9. The process of claim 2, wherein the aspect ratio of the cellulose fiber is within the range of 75–200.

10. The process of claim 9 wherein the cellulose fiber is hardwood kraft.

11. Treated fibers produced by the process of claim 9.

12. A composite containing treated fibers of claim 11 dispersed in a matrix which comprises vinyl chloride polymer.

13. Treated fibers produced by the process of claim 1.

14. A composite containing treated fibers of claim 13 dispersed in a matrix which comprises vinyl chloride polymer.

15. The composite of claim 14, wherein the fibers are present in an amount of from 1 to 40 weight percent of cellulose based on the total weight of the composite.

* * * * *